Patented Jan. 23, 1934

1,944,731

UNITED STATES PATENT OFFICE 1,944,731

ORGANIC COMPOUND HAVING HYDROGENATED RING SYSTEMS AND PROCESS OF PREPARING IT

Otto Diels and Kurt Alder, Kiel, Germany, assignors to I. G. Farbenindustrie Aktiengesellschaft, Frankfort-on-the-Main, Germany, a corporation of Germany No Drawing. Application October 29, 1928, Serial No. 315,915, and in Germany November 5, 1927

15 Claims. (Cl. 260—123)

The present invention relates to organic compounds having hydrogenated ring systems and to processes of preparing them.

This invention is based on the discovery that organic compounds with a system of "conjugated double bonds", as for instance butadiene, cyclopentadiene, phellandrene, myrcene or the like, easily form condensation products with quinones, maleic anhydride maleic acid, itaconic anhydride, citraconic anhydride, acrylic acid, acrolein and other unsaturated organic compounds containing the atomic grouping $$-\overset{O}{\overset{\|}{C}}-C=C-$$

in such a manner that the last named compounds are firmly linked to the systems with conjugated double bonds, the double bond in 1:4 position being opened up. The term "organic compounds containing a system of conjugated double bonds which is capable of addition" used in the description and the following claims is intended to cover only such compounds as contain real double bonds, i. e. organic compounds which have an unsaturated character. Aromatic compounds such as benzene which are described to contain a system of conjugated double bonds only for formal reasons are not embraced by said term.

Thus maleic anhydride or free maleic acid can easily be condensed with cyclopentadiene. By this reaction there are formed dibasic acids of the hydrogenated endo methylene-benzene, for instance

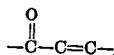

CH—CH—CH—COOH
   |    CH₂   |
CH—CH—CH—COOH which can be transformed by a catalytic hydrogenation into the corresponding fully hydrogenated systems with a methylene bridge. By substituting in this reaction butadiene for cyclopentadiene, cis-tetrahydro-ortho-phthalic acid is easily obtained, apparently having the following constitution:

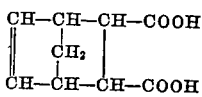

CH—CH₂—CH—COOH
‖              |
CH—CH₂—CH—COOH which may be identified by the production of hexa-hydro-ortho-phthalic acid by hydrogenation.

By the condensation of maleic anhydride with cyclohexadiene (1.2-dihydrobenzene), which is easy, a particularly interesting compound is obtained whose bridge consists of two members:

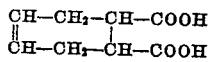

CH—CH—CH—COOH
   |   CH₂   |
   |   CH₂   |
CH—CH—CH—COOH

Also pyrrol and substituted pyrrols, furthermore furanes and other similar compounds are likewise susceptible of reacting with the aforesaid compounds. Also the observation has been made that in the same way unsaturated monobasic acids and aldehydes can likewise be condensed with systems with conjugated double bonds.

Thus acrolein, acrylic acid and ethylidene acetone react easily with cyclopentadiene with formation of the corresponding monobasic hydrogenated acid and aldehyde respectively:

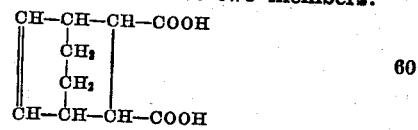

The above described condensation of maleic anhydride, citraconic anhydride, itaconic anhydride, maleic acid, acrylic acid, acrolein and the like with the respective other systems is fundamentally novel.

By means of these new reactions a large number of compounds can easily be produced by synthesis which, as for instance terpenes, sesquiterpenes, alkaloides camphors and similar hydrogenated cyclic compounds, have hitherto not been obtainable by a synthetic process and which are of great technical importance. The present invention is, therefore, of a very great value for industrial purposes.

The following examples illustrate the invention:

1. *Endomethylene-3, 6Δ⁴-cis-tetrahydrophthalic acid*

1 molecular proportion of cyclopentadiene is gradually introduced, while cooling, into a suspension of 1 molecular proportion of maleic anhydride in 5 times its weight of benzene. The components immediately react with one another with a strong evolution of heat. The anhydride of the new acid is precipitated already during the process in the form of snow-white brilliant crystals. The yield is quantitative. The melting point of the pure compound lies about 164° C.–165° C. When heated with water to boiling for a short time, it gradually dissolves and on cooling the solution, the free acid precipitates in the form of beautiful crystals melting at 177° C.-179° C. By reducing the compound with colloidal palladium, it is transformed into the corresponding saturated compound, endomethylene-3:6Δ⁴-cis-hexahydro-ortho-phthalic acid.

2. CisΔ⁴-tetrahydro-ortho-phthalic acid 2-2.5 parts by weight of butadiene dissolved in 10 parts by weight of benzene and 4 parts by weight of maleic anhydride are left in a sealed tube for 12 hours, and the mixture is then heated in the water bath to 100° C. for 5 hours. After cooling, a snow-white crystalline magma has been formed. The anhydride thus obtained is purified by repeatedly recrystallizing it from hot ligroin of medium boiling point. The yield is quantitative. The product melts at 103° C.-104° C. By boiling the anhydride for a short time with water it is converted into the corresponding cisΔ⁴-tetrahydro-ortho-phthalic acid which after a single recrystallization from water melts at 166° C.

3. Condensation on Δ¹·³-dihydrobenzene with maleic anhydride

A solution of 10 parts by weight of dihydrobenzene and 30 parts by weight of pure benzene is mixed with 12 parts by weight of maleic anhydride. The reaction sets in after a few minutes accompanied by development of heat. In the course of several hours the addition product is precipitated from the solution in the form of a glittering, pure white crystalline mass. The yield is quantitative. The endoethylene-3.6-Δ⁴. tetra-hydro-phthalic anhydride thus obtained melts at 147° C. It has probably the following structural formula:

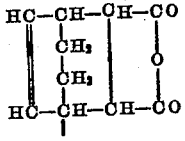

4. Endomethylene - 3,6 - tetrahydro Δ⁴-benzaldehyde

A solution of 10 parts by weight of acrolein in 15 parts by weight of ether is mixed with 14 parts by weight of cyclopentadiene. The reaction sets in with evolution of heat. When the conversion is complete the product is fractionated in a vacuum in a current of carbon dioxide. Its boiling point is 70° C.-72° C. under 620 mm. pressure. The yield amounts to about 95 per cent. of the theory. The aldehyde is a colorless, refractive oil of a characteristic, extremely adhesive clinging odour, reminiscent of valeric aldehyde. It is characterized by a well-crystallizing bisulphite compound, by a semicarbazone of melting point 160° C. and by a beautifully crystallizing condensation product with cyclohexanone melting at 104° C.-105° C.

5. Endomethylene-3,6-tetrahydro Δ⁴-benzoic acid

Molecular proportions of acrylic acid and cyclopentadiene are mixed together. Heat is evolved and when the reaction is complete, the product is distilled under diminished pressure. Thus endomethylene-3:6-tetrahydrobenzoic acid is obtained as an oil of intense valerian odour. The boiling point is 128° C.-130° C. under a pressure of about 15 mm.

6. N-methylpyrrol and maleic anhydride

By mixing equal molecular quantities of maleic anhydride and N-methylpyrrol there is obtained after a short time an orange colored solution from which beautiful granular crystals are precipitated in the course of a few days. The crude product whose precipitation is complete after about 8 to 10 days is purified by recrystallizing it from methyl alcohol and then melts at 98° C. to 99° C. The compound forms by the assemblage of 1 molecular proportion of maleic anhydride and 1 molecular proportion of N-methylpyrrol. The compound is the endo-N-methylimino-3.6-Δ⁴. tetrahydrophthalic anhydride and has probably the following constitution:

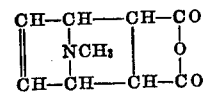

7. Furan and maleic anhydride

By adding to a suspension of maleic anhydride in ether the quantity of one mol furan calculated for one molecule the reaction gradually sets in with slight heating. It is complete after several hours, and the reaction product is then precipitated in the form of beautiful hard crystals in a quantitative yield. The compound is purified by recrystallizing it from acetic acid ester and then melts at 125° C. while foaming. It is formed of equal molecules of the starting materials. The compound is the endo-oxo-3.6-Δ⁴-tetrahydrophthalic anhydride and probably has the following constitution:

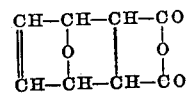

8. Reaction of maleic anhydride with myrcene 20 parts by weight of powdered maleic anhydride are cautiously heated at the temperature of the water bath with the molecular quantity, namely 27 parts by weight of myrcene. As soon as the maleic anhydride begins to melt, the supply of heat is discontinued and the two components are combined by cautiously shaking the mass. The condensation takes place almost instantaneously with strong evolution of heat. The reaction product, a nearly colorless viscous oil, is distilled in a vacuum. A small quantity of material first distils over and afterwards the new anhydride at 202° C. to 206° C. under 12 mm. pressure. When the distillate is well cooled it solidifies into a crystal mass of wax-like consistency which when recrystallized from a large quantity of low-boiling petroleum ether forms white fatty laminæ of the melting point 34° C. to 35° C. By further treating the mother liquor a second fraction of the addition product is obtained. The total yield is quantitative. The new product is the anhydride of the isohexenyl-4-cis-Δ⁴-tetrahydrophthalic acid and probably has the following constitution:

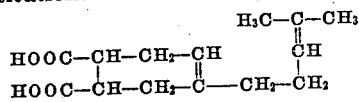

The compound is soluble in the usual solvents even in the cold to a great extent and very readily soluble in hot solvents.

In order to transform the new anhydride into the isohexenyl-4-cis-Δ⁴-tetrahydrophthalic acid, it is dissolved into a caustic potash solution of 30 per cent. strength while slightly heating. By adding ice-cold dilute sulphuric acid to the well cooled solution, the new acid precipitates as a white crystalline mass in a quantitative yield. With less cooling, an oily product is obtained which gradually solidifies only in the cold.

The acid is readily soluble in most organic solvents, but sparingly soluble in hot water. It immediately reacts with sodium permanganate and decolorizes a solution of bromine in chloroform.

By a short treatment with acetyl chloride the anhydride is re-formed.

9. Reaction of crotonic aldehyde with myrcene 10 parts by weight of myrcene and 10 parts by weight of crotonic aldehyde are heated in a pressure vessel to 150° C. The reaction mixture is subjected to the distillation in a vacuum, whereby the aldehyde is obtained as a transparent oil at 143° C. to 144° C. under 12 mm. pressure. By a repeated distillation it is obtained in an entirely pure state. It probably has the following constitution:

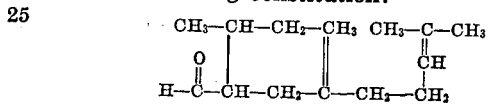

10. Reaction of crotonic aldehyde with alpha-phellandrene 10 parts by weight of alpha-phellandrene and 10 parts by weight of crotonic aldehyde are caused to react with one another under the above indicated conditions. The reaction mass is worked up in an analogous manner and the new aldehyde is obtained at 143° C. to 144° C. under 18 mm. pressure. Its smell and appearance are the same as those of the other aldehydes above described. It probably has the following constitution:

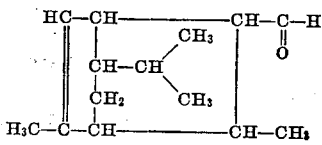

11. Reaction of acrolein with alpha-phellandrene 10 parts by weight of acrolein are caused to react with 22 parts by weight of alpha-phellandrene in the aforesaid manner. When distilling the reaction mixture in a vacuum, the almost pure aldehyde distils over at 128° C. to 130° C. under a pressure of 12 mm. and is obtained in an entirely pure state by repeating the distillation. The aldehyde is like the above described aldehydes an oil clear as water and is distinguished by the same characteristic odour. It probably has the following constitution:

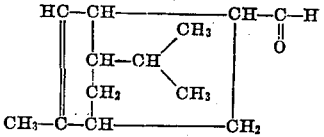

12. Reaction of crotonic aldehyde with butadiene 5 parts by weight of butadiene and 13 parts by weight of crotonic aldehyde are caused to react in the above described manner. The reaction product is distilled under reduced pressure. The first runnings consist first of crotonic aldehyde and then of a mixture of crotonic aldehyde and the new body. The fraction which finally distils over at 75° C. under 22 mm. or at 83° C. under 38 mm. pressure is received separately. By once more distilling the latter fraction the pure methyl 6-Δ³-tetrahydrobenzaldehyde is obtained as a water-clear oil. It probably has the following constitution:

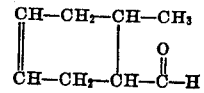

13. Reaction of crotonic aldehyde with 2.4 dimethylbutadiene 5 parts by weight of dimethylbutadiene (obtained from dimethylbutan-diol of the following formula:

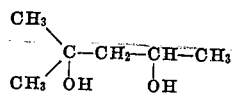

by separation of 2 molecular proportions of water) and 10 parts by weight of crotonic aldehyde are treated in the above described manner. By distillation in a vacuum the reaction product is obtained in an almost pure and by a second distillation in a perfectly pure state. It boils at 81° C. to 82° C. under 12 mm. pressure and probably has the following constitution:

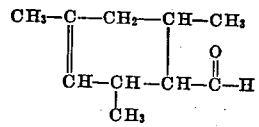

It has the same characteristic smell as the above indicated aldehydes.

14. Reaction by crotonic aldehyde with isoprene 8 parts by weight of isoprene and 12 parts by weight of crotonic aldehyde are treated as indicated in the preceding example. The reaction mixture is distilled in a vacuum. A quantity of crotonic aldehyde first distils over, and afterwards almost pure dimethyl 3,6-Δ³-tetrahydrobenzaldehyde which is obtained in an entirely pure state by a second distillation. It boils at 92° C. to 93° C. under 25 mm. pressure and probably has the following constitution:

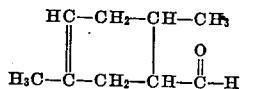

The smell is similar to that of the aldehyde described in the preceding example, but not as penetrating.

15. Reaction of crotonic aldehyde with ββ'-dimethylbutadiene 8 parts by weight of ββ'-dimethylbutadiene and 13 parts by weight of crotonic aldehyde are heated in a pressure vessel to about 150° C. for 5 hours. The reaction product is distilled in a vacuum. Crotonic aldehyde first distils over and then the new trimethyl-3,4,6-Δ³-tetrahydrobenzaldehyde in an almost pure state. After another distillation in a vacuum it shows the constant boiling point of 89° C. under 12 mm. pressure. It probably has the following constitution:

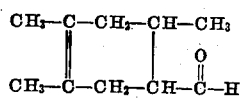

It has a characteristic, slightly penetrating smell.

16. Reaction of acrolein with 2.3 dimethylbutadiene

By heating molecular quantities of 2.3 dimethylbutadiene and acrolein in a pressure vessel to 100° C. for about 3 hours and then fractionating the contents of the vessel in a vacuum, the dimethyl-3,4-$\Delta^3$-tetrahydrobenzaldehyde is obtained in a good yield as a colorless oil of an intense odour of leaves and boiling at 79° C. under 10 mm. pressure. It has probably the following constitution:

$$\begin{array}{c} CH_3-C-CH_2-CH_2 \\ \parallel \quad\quad\quad\quad\quad\quad O \\ CH_3-C-CH_2-CH-C-H \end{array}$$

17. Reaction of acrolein with isoprene

Acrolein is easily condensed with isoprene in a pressure vessel by heating the components to 100° C. as it has been described in the preceding example given for dimethyl 2.3-butadiene.

The methyl 3,-(4?)-$\Delta^3$-tetrahydrobenzaldehyde thus obtained in a good yield is very similar to its homologues as regards its smell, behaviour and appearance. It has probably the following constitution:

$$\begin{array}{c} CH-CH_2-CH_2 \\ \parallel \quad\quad\quad\quad\quad O \\ CH_3-C-CH_2-CH-C-H \end{array}$$

It boils at 63–64° C. under 10 mm. pressure.

18. Reaction of acrolein with myrcene

Myrcene is easily condensed with acrolein by heating the two components in a pressure vessel to 100° C.

The isohexenyl-3-(4?)-$\Delta^3$-tetrahydrobenzaldehyde thus obtained is a colorless oil of a very agreeable intensely fruit-like odour. It boils at 140° C. to 142° C. under 10 mm. pressure. It probably has the following constitution:

$$\begin{array}{c} \quad\quad\quad\quad\quad\quad\quad H_3C-C-CH_3 \\ O \quad CH_2-CH_2-CH \quad\quad CH \\ \parallel \quad\quad\quad\quad\quad\quad\parallel \\ H-C-CH-CH_2-C-CH_2-CH_2 \end{array}$$

19. Reaction of acrolein with 2.4-dimethylbutadiene

This reaction is easily effected by heating molecular quantities of 2.4-dimethylbutadiene and acrolein in a pressure vessel to 100° C. for about three hours. The aldehyde thus obtained is very similar to that of its above described isomeride. It is a colorless liquid of an intensely grass-like odour boiling at 86° C. to 88° C. under 12 mm. pressure and probably has the following constitution:

$$\begin{array}{c} CH_3-C-CH_2-CH_2 \\ \parallel \quad\quad\quad\quad\quad\quad O \\ CH-CH-CH-C-H \\ \vert \\ CH_3 \end{array}$$

20. Reaction of maleic anhydride with 1-phenylbudadiene 7.5 parts by weight of maleic anhydride and 10 parts by weight of phenylbutadiene are cautiously heated at the temperature of the water bath until a violent boiling of the solution indicates the beginning of the reaction. Heating is discontinued, the reaction is allowed to go to its end and the product is then finally heated to boiling for about 10 minutes in order to complete the conversion, if necessary while adding a small quantity of benzene.

The reaction product usually begins to precipitate already while hot as a white crystalline mass; on cooling the whole solidifies into a crystal cake.

For analyzing the substance it is re-crystallized from high-boiling ligroin with the addition of benzene and thus obtained in the form of beautiful, purely white hard crystalline needles which melt at 120° C. It probably has the following constitution:

$$\begin{array}{c} \quad\quad CH==CH \\ \diagup\!\!\!\diagdown \quad CH \quad\quad CH_2 \\ \quad\quad CH——CH \\ \quad\quad CO—O—CO \end{array}$$

The 3-phenyl-$\Delta^4$-cis-ortho-tetrahydrophthalic anhydride is readily soluble in the usual organic solvents even in the cold, sparingly soluble, however, in water, ligroin and petroleum ether. Bromine in chloroform does not act upon it in the cold, but sodium permanganate is immediately reduced. It is not soluble in boiling water, but readily soluble in an aqueous alkali.

21. Reaction of maleic anhydride with 1-phenyl-4-methylbutadiene

The condensation of 1 mol maleic anhydride with 1 mol of phenylmethyl-1,4-butadiene takes place under the same conditions 3-phenyl-6-methyl-$\Delta^4$-cis-ortho-tetrahydrophthalic anhydride is obtained melting at 158° C.–159° C. It probably has the following constitution:

$$\begin{array}{c} \quad\quad CH==CH \\ \diagup\!\!\!\diagdown \quad CH \quad\quad CH-CH_3 \\ \quad\quad CH——CH \\ \quad\quad CO—O—CO \end{array}$$

Its appearance and properties are the same as those of its homologue above described.

22. Reaction of maleic anhydride with 1.4-diphenylbutadiene 5 parts by weight of 1.4-diphenylbutadiene and 2.4 parts by weight of maleic anhydride are cautiously fused together. The conversion takes place, while the orange-colored reaction mass slightly boils up and is entirely decolorized. On cooling, the fused mass solidifies into a compact, almost colorless crystalline mass.

For its complete purification the product is recrystallized from benzene in which it is, however, only moderately soluble even at boiling temperature.

It is thus obtained in the form of purely white laminæ melting at 207° C. in a similar manner as naphthalene. It probably has the following constitution:

$$\begin{array}{c} \quad\quad CH==CH \\ \diagup\!\!\!\diagdown \quad CH \quad\quad CH \quad \diagup\!\!\!\diagdown \\ \quad\quad CH——CH \\ \quad\quad CO—O—CO \end{array}$$

Since analysis shows one molecule of crystal benzene, the substance is dried at 100° C. in a vacuum for several hours over phosphorus pentoxide until the weight is constant.

The 3,6-diphenyl-$\Delta^4$-tetrahydro-cis-ortho-phthalic anhydride thus obtained is only sparingly soluble in the usual organic solvents even when hot, but comparatively readily soluble in warm alkalies. Sodium permanganate is immediately reduced; bromine in chloroform, however, acts only slowly in the cold.

23. Reaction of cyclopentadiene and di-methyl maleic anhydride 3 parts by weight of di-methyl maleic anhydride are heated with 8 parts by weight of freshly distilled cyclopentadiene with the addition of 2 parts of benzene in a pressure vessel to about 100° C. for 4 hours. The crystalline mass which precipitates on cooling is filtered by suction and treated for about 20 minutes with steam in order to eliminate any unaltered di-methyl maleic anhydride. The distillate is received in several fractions, since the condensation product is likewise, although more difficultly, volatile with water vapor. After well cooling the various fractions and the vessel in which the operations has been carried out, the fractions are filtered by suction, whereby a substance is obtained melting at about 150° C. The substance thus obtained is heated for a short time with acetyl chloride. After the acetyl chloride has evaporated, the reaction product, namely endomethylene-3,6-dimethyl-1,2-Δ⁴-tetrahydrophthalic anhydride is obtained by recrystallization from ligroin of a medium boiling point in the form of beautiful white crystals melting at 155° C. It probably has the following constitution:

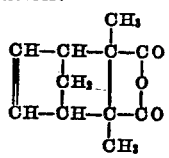

24. Reaction of cyclopentadiene with crotonic aldehyde 8 parts by weight of crotonic aldehyde are heated in a pressure vessel with 10 parts by weight of freshly distilled cyclopentadiene to about 100° C. for 4 hours. The reaction mixture is then distilled in a vacuum, whereby under 12 mm. pressure a colorless oil is obtained distilling over at 60° C. to 85° C. and representing a mixture of two stereo isomeric aldehydes. They probably have the following constitution:

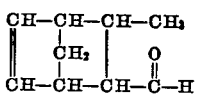

25. 84 parts by weight of ethylidene-acetone of the formula $CH_3-CH=CH-CO-CH_3$ and 99 parts by weight of freshly distilled cyclopentadiene are heated in a pressure vessel to 150° C. for 5 hours. The feebly greenish-yellow liquid is distilled in a vacuum. The main fraction boils at 76° C.–80° C. under 13 mm. pressure. It is a transparent mobile oil of a camphor-like odor.

26. A mixture of 150 parts by weight of cis-cyclo-hexadiene-(3.5) dicarboxylic anhydride-(1.2) and 147 parts by weight of maleic anhydride is slowly heated. When the temperature of the bath has reached about 100° C.–105° C. the mass becomes entirely fused. A lively reaction sets in, which, when larger quantities are involved, can be moderated by the addition of a suitable diluent, such as benzene, toluene or the like; the reaction manifesting itself by the evolution of steam and an increase of the temperature. After a few minutes, the molten mass solidifies. The temperature of the bath is then slowly raised up to about 200° C., whereupon it is advantageous to distill off the excess of maleic anhydride. The residue shows an almost white color. This residue is boiled up with 250 parts by weight of acetic ester or a similar organic solvent. The mass is then cooled, filtered by suction and washed with a small quantity of acetic ester. In this manner entirely pure, glittering crystals of a sand-like structure are obtained with a very good yield, the product melting at 390° C.–395° C.

This new product is the endoethylene-hexahydro-benzene-tetracarboxylic anhydride and has probably the following constitution:

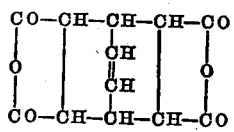

We claim:
1. The process of preparing compounds having a hydrogenated ring system, which comprises causing a compound containing the atom group

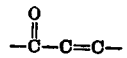

to react with an organic compound containing a system of conjugated double bonds which is capable of addition.

2. Compounds of the following probable structure:

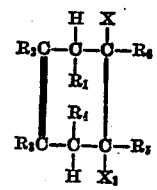

in which $R_1$ and $R_4$ are hydrogen, methyl or phenyl, or $R_1$ and $R_4$ together constitute an alkylene radical, $-NCH_3-$, or $-O-$, $R_2$ is hydrogen or alkyl, $R_3$ is hydrogen or alkyl, $R_5$ is CO-methyl, COH, COOH, $R_6$ is hydrogen, methyl, or with $R_5$ the group

or COOH when $R_5$ is COOH and X and $X_1$ are hydrogen or methyl, said compounds being obtainable by causing a compound of the following general structure:

wherein $R_5$ stands for CO-methyl, COH, COOH and $R_6$ is hydrogen, methyl or with $R_5$ the group

or COOH when $R_5$ is COOH and X and $X_1$ are hydrogen or methyl to react with an organic compound containing a system of conjugated carbon-carbon double bonds.

3. Compounds as defined in claim 2 wherein $R_5$ and $R_6$ are both COOH or together form

4. Compounds as defined in claim 2 wherein $R_1$ and $R_4$ together constitute an alkylene radical, —N CH₃— or —O— and R₅ and R₆ are both COOH or together form the radical

5. As a new product, the endomethylene-3,6-Δ⁴ tetrahydrophthalic anhydride of the following formula:

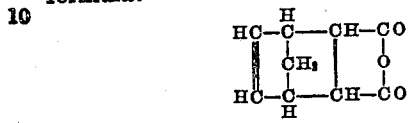

forming snow-white crystals and having a melting point of about 164° C. to 165° C.

6. The process of preparing compounds having a hydrogenated ring system which comprises causing a compound of the following general formula:

wherein R₁ stands for the COOH group, the

or

group and R₂ stands for the COOH group or R₁ and R₂ jointly stand for the atom group —CO—O—CO— and the X's represent hydrogen or methyl to react with an organic compound which contains a system of conjugated carbon-carbon double bonds.

7. The process of preparing compounds having a hydrogenated ring system which comprises causing a compound of the following general formula:

wherein R₁ stands for the COOH group, the

or

group and R₂ stands for the COOH group or R₁ and R₂ jointly stand for the atom group —CO—O—CO— and the X's represent hydrogen or methyl to react with a compound of the following general formula:

wherein R stands for

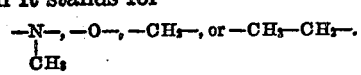

8. The process of preparing compounds having a hydrogenated ring system which comprises causing a compound of the following general formula:

wherein R₁ stands for the COOH group and R₂ for the COOH group or R₁ and R₂ jointly stand for the atom group —CO—O—CO— to react with an organic compound which contains a system of conjugated carbon-carbon double bonds.

9. The process of preparing compounds having a hydrogenated ring system which comprises causing a compound of the following general formula:

wherein R₁ stands for the COOH group and R₂ stands for the COOH group or R₁ and R₂ jointly stand for the atom group —CO—O—CO— to react with a compound of the following general formula:

wherein R stands for

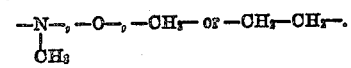

10. The process of preparing compounds having a hydrogenated ring system which comprises causing maleic anhydride to react with a compound of the following general formula:

wherein R stands for

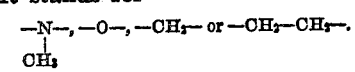

11. The process of preparing compounds having a hydrogenated ring system which consists in causing maleic anhydride to react with cyclopentadiene.

12. As new products compounds of the following general formula:

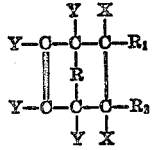

wherein R₁ and R₂ stand for COOH or R₁ and R₂ jointly stand for the atom group —CO—O—CO—, the X's and Y's represent hydrogen or methyl and R stands for

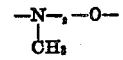

or an alkylene bridge of one or two carbon atoms.

13. As new products compounds of the following general formula:

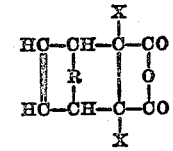

wherein the X's stand for hydrogen or methyl and R stands for

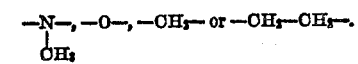

14. As new products compounds of the following general formula:
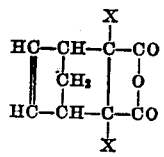
wherein the X's stand for hydrogen or methyl.
15. The compound of the formula,
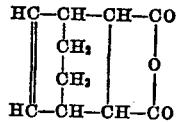
forming white crystals and having a melting point of 147° C.
OTTO DIELS.
KURT ALDER.